United States Patent Office 3,729,411
Patented Apr. 24, 1973

3,729,411
METHOD OF REMOVING OIL FROM WATER
Joseph V. Otrhalek, Dearborn, Mich., assignor to BASF
Wyandotte Corporation, Wyandotte, Mich.
No Drawing. Filed Feb. 16, 1971, Ser. No. 115,879
Int. Cl. E02b 15/04
U.S. Cl. 210—36                                 3 Claims

ABSTRACT OF THE DISCLOSURE

Oil slicks and other oil films are removed from bodies of water by casting onto the water a silicone-treated expanded volcanic ash containing, optionally, a thickening agent, and, thereafter, removing the oil absorbed composition from the water.

BACKGROUND OF THE INVENTION

(1) Field of the invention

The present invention pertains to the removal of oil films from water. More particularly, the present invention pertains to an improved absorbent for selectively absorbing oil films from water and to methods for deploying same.

(2) Prior art

In U.S. Pat. No. 3,382,170 there is disclosed an oil absorbent substance adapted for selectively removing oil films from bodies of water. The substance consists essentially of silicone-coated expanded perlite. The major drawback associated with this substance is the difficulty encountered in removing it from water when saturated with oil. Rather than forming a relatively hard cake, the substance, upon prolonged exposure to water, tends to disagglomerate making pick-up extremely tendious and difficult.

The present invention seeks to obviate this problem by providing an oil absorbent product which, upon prolonged exposure to water, agglomerates to form a relatively hard cake hvaing the oil selectively absorbed therewith.

SUMMARY OF THE INVENTION

In accordance with the present invention an oil absorbent for selectively removing an oil film from a body of water is provided which is a silicone-treated expanded volcanic ash having, optionally, added thereto a thickening agent.

The so-treated volcanic ash is cast directly into the oil film and circumferentially therearound whereupon it absorbs the oil from the water. The oil-containing ash then agglomerates to form a relatively hard cake on the water surface which can be picked up with relatively facility.

The expanded volcanic ash employed herein is a unique porous product prepared by contacting normal volcanic ash with a direct flame to provide an expanded highly porous product.

For a more comprehensive discussion of the present invention, reference is made to the following detailed description and examples thereof.

DESCRIPTION OF THE PREFERRED EMBODIMENT

The present invention provides a silicone-treated expanded volcanic ash, optionally, having added thereto a thickening agent. As noted hereinbefore this product is excellent for absorption of oil films because of its ability to agglomerate to form a relatively hard cake, even upon prolonged exposure to moisture. This product is also extremely useful as a filtering medium, especially adapted for removing oily substances entrained in waste effluents, to clarify water prior to discharging it into a waterway.

As commonly used, the term "volcanic ash" means pumiceous or scoriaceous material which is a highly cellular, glassy lava, which may be either acidic or basic. It is commonly referred to as, black ash, volcanic dust, lapilli, or pumice. It is a material which is essentially unaltered since its formation. This is contrasted with perlite which is a consolidated siliceous rock or crystal containing from 3 to 5% water vapor, or obsidian rock having a concentric ring or onion-like structure and pearly luster. Although perlite and volcanic ash are similar in oxide content, they are distinct physically and petrographically.

Moreover, there are differences between volcanic ash, pumice, black ash, etc., depending on the geological region in which the material is found. In the practice of the present invention it has been found that the volcanic ash indigenous to the State of Kansas and in particular the Calvert ash bed is particularly preferred, since it is comprised of shards of unconsolidated finely divided or particulate material, as opposed to conventional consolidated pumice, scorice, obsidia and the like. A more complete discussion of these minerals can be found in Bureau of Mines, Mineral Facts & Problems, Bulletin 630, 1965 edition, published by the United States Department of the Interior; and "Volcanic Ash for Industry," State Geological Survey of Kansas, Bulletin 157, part 3, 1962.

According to the present invention expanded volcanic ash is prepared by contacting the volcanic ash with a direct flame, such as, a gas flame, at a temperature ranging from about 1200 to 1800° F. for a period of at least about 0.1 second. There is no maximum contact time, but from an economic standpoint, the contact time will seldom exceed about 120 seconds. Expansion can be achieved by either a batch or continuous process. In a batch process the volcanic ash is placed in a suitable vessel equipped with flaming means and agitation means so as to bring each discrete particle of ash into direct contact with the flame.

In a continuous process, the volcanic ash is top loaded into a vertical or horizontal cylindrical reactor or expander being designed to provide the proper descent time and dwell time within the reactor and wherein a flame directly contacts the ash as it descends the reactor. It is to be understood, however, that the mechanical apparatus employed in connection with expanded the volcanic ash does not form part of the present invention. However, it should also be noted, that when the ash is expanded in a horizontal reactor, the expansion temperature will be somewhat lower.

Upon expansion the ash has a bulk density of from about 2 to 30 lbs./cu. ft. In the practice of the present invention it is preferred to use an expanded volcanic ash having an apparent bulk density of from about 4 to 12 lbs./cu. ft.

After the ash is expanded, it is then contacted, preferably by spraying, with a silicon surfactant at a temperature of about 300 to 1500° F. and preferably from about 500 to 1000°. Contacting the ash with the surfactant at elevated temperatures ensures more intimate contact with the spray and eliminates any water which is present in the system to ensure a dry, free flowing, uniformly coated product when the product is recovered.

To achieve this result, the expanded volcanic ash can be air conveyed directly from the expander into a cyclone classifier for separating the ash from any gasses. While the ash is transferred, it is sprayed with the surfactant, through suitable sprayer heads or the like.

The silicone surfactant imparts to the ash the attribute of preferential absorption of oil when the ash is spread on a body of water. It also promotes formation of the cake or cohesive mass which can readily be picked up with a screen or other suitable means.

Suitable silicone surfactants are the conventional siloxane polymers, such as dimethyl polysiloxane or the dimethyl silicone polymers having the general formula:

$$[(CH_3)_2SiO]_x$$

These products are widely known and commercially available. These silicones are preferentially employed as water emulsion thereof, which are also commercially available. Generally, these emulsions contain from 1.0 to 80.0% by weight of silicone, based on the weight of emulsion and, preferably from about 5.0 to 60% by weight of silicone, based on the weight of the emulsion. In commercial form these emulsions generally contain minor amounts of stabilizing surfactants and the like which do not impair or detract from their use in the present invention. A particularly preferred commercial product is that manufactured and sold by Union Carbide Corporation under the name RE-28 Silicone Emulsion which is a water emulsion containing about 40% by weight of silicone with a total solids content of about 43% by weight. This product is milky white and has a pH at 25° C. of from 4 to 5.

It is to be noted that the water of the emulsion does not hinder or impair the present invention because it is quickly evaporated since the emulsion is contacted with the ash at the above-described elevated temperature.

In preparing the silicone-treated expanded volcanic ash, the silicone emulsion is conventionally diluted 20:1 with water and this solution employed in an amount ranging from 25 to 400 cc. thereof per cubic foot of expanded volcanic ash.

After spraying, the silicone-treated ash is then cooled, recovered and ready for use.

Optionally, a thickening agent, or thickener, can be added to the silicone-treated expanded volcanic ash to further improve caking in water. The thickener promotes the stiffening of the oil-saturated mass of expanded volcanic ash.

Suitable thickening agents include hydroxyalkyl cellulose compounds, synthetic higher molecular weight polymers, and naturally occurring products, such as Algin extract and the like. Representative hydroxyalkyl cellulose compounds are hydroxymethylcellulose, hydroxyethylcellulose, hydroxypropyl methylcellulose, and the like. Representative synthetic higher molecular weight polymers are, for example, polyacrylamides, polysaccharides, polyethylene glycols, and the like. Other suitable naturally occurring products are, diatomaceous earth, kieselguhr earth, rottenstone, clay, and the like.

Any of the above-described thickening agents can be used with equal effectiveness herein.

Generally, the thickener is employed in an amount ranging up to about 80% by weight, based on the weight of the silicone-treated expanded volcanic ash. Usually, less than 1% by weight of thickener will be ineffective. Preferably, from about 3 to 20% by weight of thickener, based on the weight of silicone-treated ash, is added to the ash.

In removing an oil slick or similar film, from a body of water, either fresh water or brine, the treated ash is spread onto and around the slick, where after about 5 minutes it will become adsorbed with oil and form a firm cake. The cake can then be picked up with any suitable means. Alternatively, the oil-laden cake can remain on the water surface, where after about 2 to 4 weeks, due to weathering, it will disperse along with the oil slick.

For a more complete understanding of the present invention, reference can be made to the following examples. In the examples, the expanded volcanic ash was prepared in a vertical expander equipped with direct flames means. The temperature in the reactor was about 1500° F. The ash was contacted with the flame for about 1 second and was then conveyed from the reactor to a cyclone gas separator where it was then sprayed with the silicone emulsion at about 800° F. The emulsion, diluted 20:1 with water, was employed in an amount of about 400 cc. of solution per cubic foot of expanded volcanic ash. The so-treated ash had an apparent bulk density of from 6 to 8 lbs. per cubic foot.

EXAMPLE I

This example illustrates the oil absorption properties of silicone-treated volcanic ash, under vacuum filtration conditions.

A 25 gm. sample of silicone-treated expanded volcanic ash was packed in a funnel operatively connected to suitable evaporation means and oil collection means. A mixture of 10% crude oil on water was poured into the funnel and was attempted to be drawn through the ash sample by the vacuum. This procedure was continued until oil appeared in the oil collection means. At a 1" mercury vacuum more than 250 mls. of oil were absorbed by the ash; at a 2" mercury vacuum more than 250 mls. of oil were absorbed by the ash; and at a 3" mercury vacuum 100 mls. of oil were absorbed.

This procedure was then repeated using a 25 gm. sample of silicone-treated expanded perlite, a product sold by Silbrico Company, under the name RYOLEX. At a 1" mercury vacuum the perlite absorbed 80 mls. of crude oil; at 2" mercury vacuum the perlite absorbed 35 mls. of oil; and at a 3" mercury vacuum, the perlite absorbed 25 mls. of oil.

Thus, this example illustrates the great improvement in oil absorption of silicone-treated expanded volcanic ash over silicone-treated expanded perlite.

EXAMPLE II

This example illustrates the advantages of the silicone-treated expanded volcanic ash over commercially available absorbents in regard to oil absorption fthe Gardner-Coleman Test.

The Gardner-Coleman test generally comprises placing a sample of the product in an evaporating dish and titrating the product with crude oil at a rate of 1 drop per second until all particles of the product appear to be wet. This is achieved by constantly exposing a dry particle to the dripping oil. After all the particles appear to be wet, the amount of oil titrated is measured and the product is then allowed to stand for 10 minutes to permit oil absorption. The titration is then repeated and the amount of oil titrated is again measured. The first amount of oil added determines the initial end point and the second measurement determines the final end point. The amount of oil absorbed at each end point is determined by the following equation:

$$100 \frac{\text{lbs. oil absorbed}}{\text{lbs. of absorbent}} = \frac{\text{mls. oil titrated} \times 0.87 \times 100}{\text{gms. of sample}}$$

Using a 5 gm. sample of ash, the initial end point was 21.7 mls. of oil titrated or 377.6 lbs. of oil per 100 lbs. of silicone-treated ash and the final end point was 23.1 mls. of oil titrated or 401.9 lbs. of oil absorbed per 100 pounds of ash.

The procedure and calculation was repeated using a 5 gm. sample of Ekoperl, an expanded perlite and a 5 gm. sample of Micro-Cell E, a hydroxymethylcellulose absorbent, a product manufactured by Dow Chemical.

The results of these comparative tests were as follows:

| | Sample | |
|---|---|---|
| | Ekoperl | Micro-Cell E |
| Initial end point, mls. oil titrated | 16.6 | 22.3 |
| Lbs. of oil absorbed/100 lbs. absorbent | 288.8 | 288.0 |
| Final end point, mls. oil absorbed | 21.6 | 23.7 |
| Lbs. of oil absorbed/100 lbs. absorbent | 375.8 | 412.4 |

Although, the Micro-Cell E had comparable absorption properties, it was found to be extremely difficult to handle and, therefore, impractical to be used since it tended to form a slimy mass.

EXAMPLE III

This example illustrates the physical attributes of the products of the present invention.

In a suitable beaker 10 ml. of crude oil was placed on the surface of 800 ml. of water. The silicone-treated ash was then intermittently sprinkled on the surface of the oil. This was continued until no more oil was visible on the surface of the water. A total of 1.6 gm. of ash were required to pickup the oil. Additionally, the oil-adsorbed ash formed a firm cake floating on the water.

This procedure was then repeated with Ekoperl, silicone-treated perlite (RYOLEX), and non-silicone-treated ash. It required 2.5 gm. of Ekoperl to absorb the 10 ml. of oil; 3.0 gm. of silicone-treated perlite to absorb the oil; and 30.0 gms. of non-treated volcanic ash to absorb the 10 ml. of oil. Additionally, the Ekoperl formed a loose agglomeration on the surface of the water as did the silicone-treated perlite, and the expanded ash formed a soft mass on the surface.

EXAMPLE IV

This example provides a further comparison of silicone-treated expanded perlite and silicone-treated expanded unconsolidated volcanic ash, employing a modified Gardner-Coleman Test as described in Example I. The modification involved the elimination of the determination of the initial end point and the test was concluded when oil remained along the sides of the evaporating dish at which point the product and oil have a "mushy" consistency.

By this modified procedure, the ash had an end point of 16.1 ml. of absorbed oil per 5 gm. of ash which is equivalent to absorbing 280.1 lbs. of oil per 100 lbs. of ash. The perlite had an end point of 13.6 ml. of absorbed oil per 5 gm. of perlite which is equivalent to 236.6 lbs. of oil per 100 lbs. of perlite. Hence, the greater absorption properties of hte silicone-treated ash over silicone-treated perlite became evident.

EXAMPLE V

This example illustrates another advantage of silicone-treated expanded unconsolidated volcanic ash.

70.8 gm. (100 ml.) of oil was poured onto the surface of water contained in an evaporating dish. A fine wire mesh pouch packed with 25 gm. of silicone-treated ash was then placed on the oil until all the oil was absorbed by the ash, the ash absorbing 2.85 gm. of oil per gm. of ash.

After the oil was absorbed into the ash, the oil was then burned off therefrom, and the ash reused. On reuse the ash absorbed 2.66 gms. of oil per gm. of ash.

Thus, it is seen that the silicone-treated volcanic ash can be effectively reused after removing the oil absorbed therein..

I claim:

1. A method for removing oil from water in an oil-water system comprising: absorbing the oil from the oil-water system with a silicone treated expanded finely divided shards of unconsolidated volcanic ash indigenous to the State of Kansas the expanded ash having an apparent bulk density of from about 4–12 lbs./cu.ft., the silicone treated ash being prepared by spraying expanded ash with silicone treated ash being prepared by spraying expanded ash with a silicone emulsion, consisting essentially of 20 parts by weight of water per weight of emulsion, at a temperature ranging from about 300–1500° F. and in an amount ranging from about 25 to 400 cc. of emulsion per cubic foot of ash.

2. The method of claim 1 wherein the ash has added thereto a thickening agent.

3. The method of claim 2 wherein the thickening agent is present in an amount of from about 3 to 20% by weight, based on the weight of the ash.

References Cited

UNITED STATES PATENTS

| | | | |
|---|---|---|---|
| 3,097,832 | 7/1963 | Murdock et al. | 252—378 R |
| 3,382,170 | 5/1968 | Pape | 210—36 |
| 3,589,844 | 6/1971 | Kraemer | 210—40 |

SAMIH N. ZAHARNA, Primary Examiner

U.S. Cl. X.R.

210—40, Dig 21; 252—378